(No Model.) 2 Sheets—Sheet 1.
W. DAVY.
METHOD OF MAKING BALLAST AND PAVING MATERIAL.
No. 371,042. Patented Oct. 4, 1887.
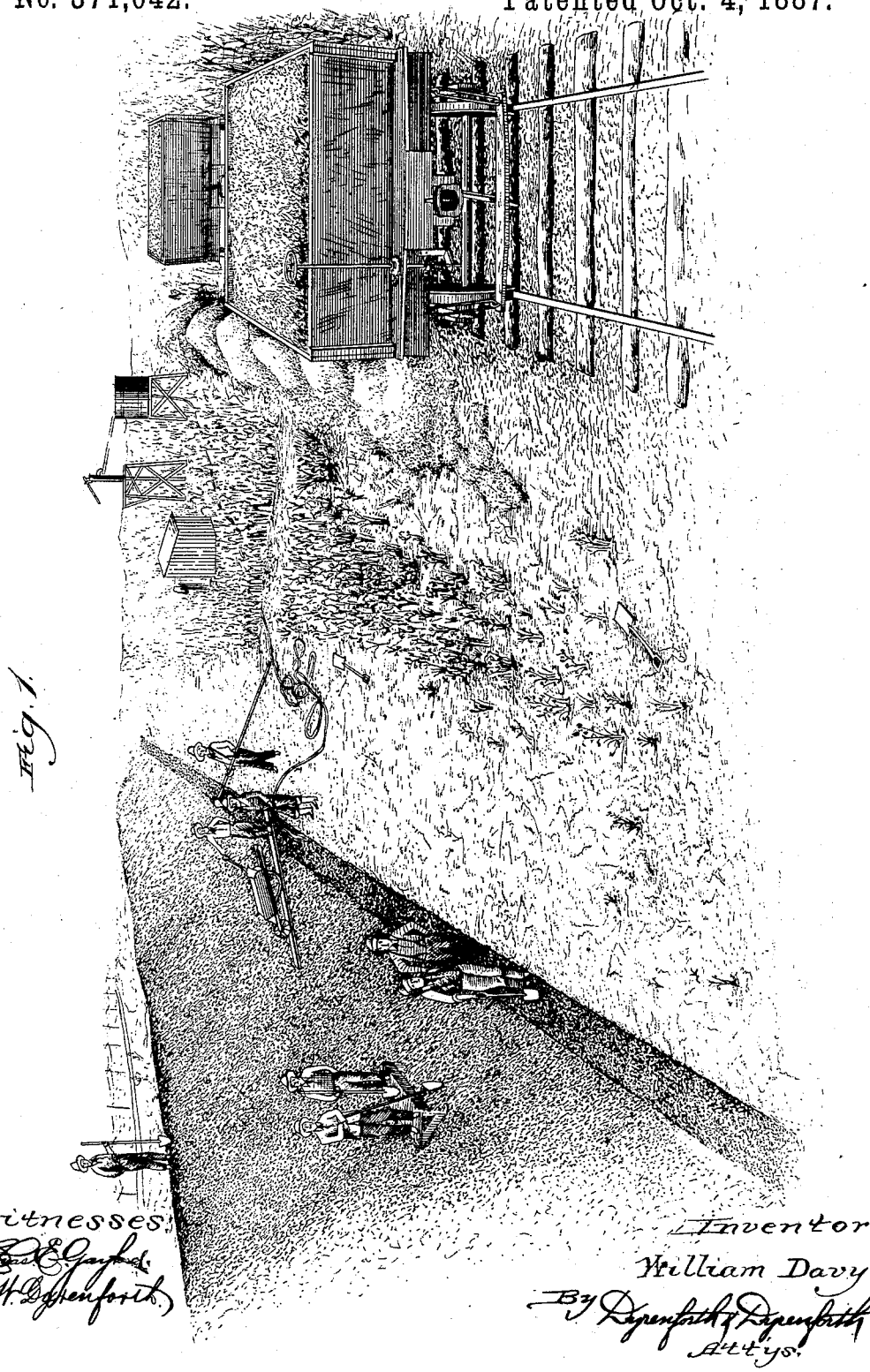

(No Model.) 2 Sheets—Sheet 2.
W. DAVY.
METHOD OF MAKING BALLAST AND PAVING MATERIAL.
No. 371,042. Patented Oct. 4, 1887.
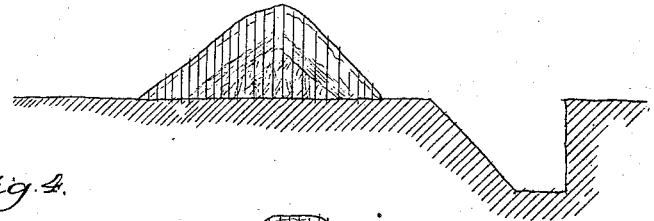
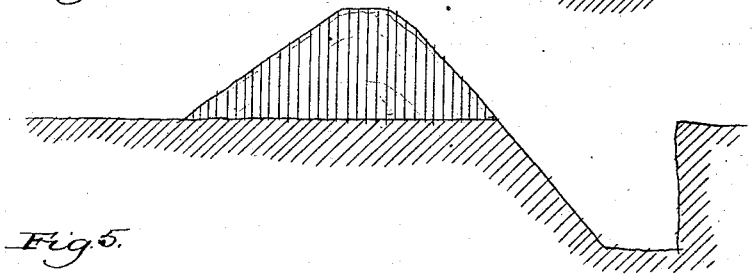
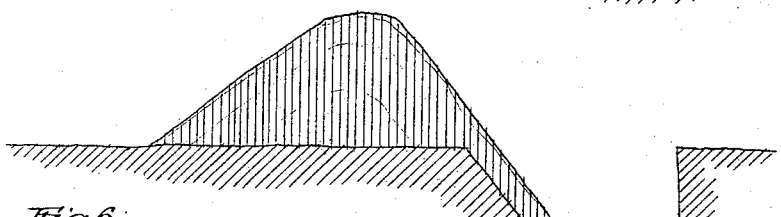
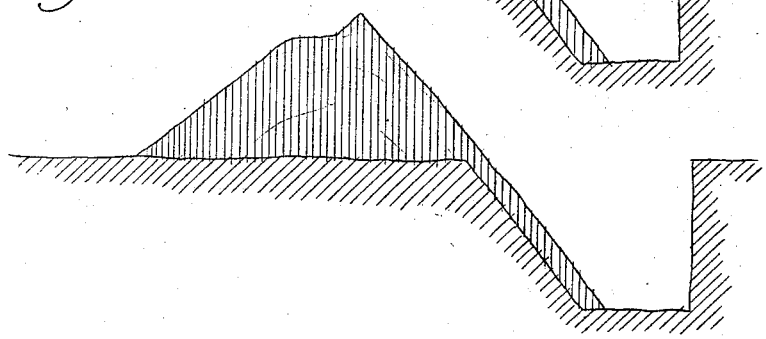
Witnesses:
Chas. E. Gaylord
J. W. Dyrenforth
Inventor:
William Davy
By Dyrenforth & Dyrenforth
Att'ys

UNITED STATES PATENT OFFICE.

WILLIAM DAVY, OF KENOSHA, WISCONSIN.

METHOD OF MAKING BALLAST AND PAVING MATERIAL.

SPECIFICATION forming part of Letters Patent No. 371,042, dated October 4, 1887.

Application filed March 26, 1887. Serial No. 232,475. (No model.)

*To all whom it may concern:*

Be it known that I, WILLIAM DAVY, a citizen of the United States, residing at Kenosha, in the county of Kenosha and State of Wisconsin, have invented a certain new and useful Improvement in the Method of Burning Clay to Make Ballast and Paving Material; and I hereby declare the following to be a full, clear, and exact description of the same.

My present method is in the nature of an improvement upon the method described and claimed in Letters Patent of the United States No. 305,432, granted me on the 23d day of September, 1884.

The principal feature of novelty of my said former invention (in view of the previous state of the art showing the burning in kilns of clayey earths in conjunction with fuel) consisted in performing the burning operation in the open air, whereby the material advantages set forth in my aforesaid patent are attained. By means of my present improvement upon my aforesaid former method I am enabled, among other advantages hereinafter stated, to produce at least twice the amount of the product in the same time and with the same help, thereby also greatly reducing the cost of the finished material, which may be used for laying upon railroad-tracks as ballast, for macadamizing roads, for sidewalks, foundations, and the like, since it comprises extremely hard igneous matter and prevents the growth of vegetation upon railroad-tracks when it is used as ballast.

The most common application of the product of my method has hitherto been that to the tracks of railroads as ballast; hence I prefer to describe my improvement as being practiced in close proximity to a line of railroad, since for making the product for use as ballast the method is pursued in all of its details on the most elaborate scale, owing to the large quantity required, although it will be understood that for making the product for the purposes mentioned other than ballast the method differs, if at all, only in the matter of degree.

Following is a full description of my improvement in all its details for burning clay to produce railroad-ballast.

A location is selected, as near as possible to the railroad, upon ground containing clay. At or near the edge of one boundary-line of the clay, upon the surface of the ground, I lay in a straight line, perhaps a thousand or more feet in length, kindling material, which I cover over with wood in sticks of from twelve to fourteen inches long, stacked up transversely and contiguously to slope against opposite sides of the line of kindling material, and cause the adjacent ends to meet above the pile. I then dig, at a line parallel with the pile of fuel aforesaid and about four feet away from the same, thereby forming, incipiently, a trench, clay, which is placed in lumps along the opposite edges of the pile of kindling to stay more clay, dug as aforesaid, and heaped in layers from the ground upward to a thickness of several inches—about four—upon the pile. All the intervening spaces produced in the piling between the wood and the clay are then filled up with coal (nut-coal or coal-slack) until the wood is entirely covered, except as to holes left on the top from three to four feet apart along the entire line, through which to introduce coal-oil or other similar inflammable material in small quantity at each hole, where the igniting is performed by means, preferably, of a torch introduced therein. After ignition coal is dropped into the holes, whereupon they are filled up with clay. As soon as the fire has made sufficient headway to be considered thoroughly lighted, coal is scattered lightly over the pile throughout its entire length, which scattering operation I term "slacking," and employ that term to designate it throughout this description, though the kind of coal employed need not be slack in any one of the steps of my method, as nut-coal also answers. When the fire has burned sufficiently to reduce the long pile to a glowing mass, another covering of clay like the first and similarly dug is placed upon it, which is followed in due course, before piling on more clay, by slacking. The slacking of the glowing mass, piling on of clay, and again slacking each time before piling on more clay are continued until the fire, owing to the increase in its dimensions, requires drawing or raking, which is necessary to the proper burning of ballast to maintain the fire in proper shape and good at the bottom, where it burns less well than toward the top. When the fire requires drawing, the clay that has not been thoroughly acted on by the fire, and is therefore unburned or insufficiently burned, is removed and the fire pulled to the ground on opposite sides, forming a gradual slope from the ground to the top. When by the time the fire, owing to the lateral increase of its dimensions by the successive drawing, slacking, and piling of additional clay, reaches the edge of the trench or ditch, increased in size by the digging of the clay deposited, as aforesaid, upon the fire, it is continued into the same in one of two ways—namely, by building a wall or abutment of clay at the edge of the trench and covering the fire with coal and clay for a few days without drawing or raking it. When the heap is burned, the clay wall is undermined about two feet below the ground-surface in the trench and the fire allowed to fall to the bottom of the latter, from which it slopes to the top of the fire. It is then coaled and covered with clay, as previously described. The other way is merely to undermine the bank of the fire adjacent to the ditch, thereby causing the glowing mass on that side to fall into the same, and then shovel from the opposite side sufficient fire to afford a perfect slope and insure burning.

As thus far described the method refers to burning on both sides of the longitudinal pile. As the dimensions thereof increase, however, it becomes inconvenient to handle it from the side whereon is the ditch or trench, so that if it is desired to continue the burning on both sides it becomes desirable to dig a trench on the opposite side and supply therefrom the clay to the adjacent side of the pile. Of course, if it is intended thus to burn on opposite sides, the fire must not be started, as hereinbefore described, at or near the boundary-line of the clay-supply, but rather toward the center of the same. Ordinarily, however, after the fire has reached dimensions, transversely speaking, which render it inconvenient to add material to both sides, I prefer to continue on the one side only, particularly by reason of an advantage gained, consisting in the consequent possibility, which does not exist when the burning is done on both sides, of supplying ballast for use from the side permitted to cool off while the material is being produced at the opposite side.

The last of the two ways hereinbefore stated for tumbling the fire into the ditch by undermining is the one preferred when the burning is continued on one side of the pile only.

In the drawings I have aimed to add to the clearness of the description by illustrating my method as actually practiced in ballast-making and the steps in the same sufficiently for the purposes of the illustration.

Figure 1 presents a landscape view showing the practical application of my method to the burning of clay in the open air for producing ballast. Fig. 2 shows a cross-sectional view of the fire in an incipient stage; Fig. 3, a similar view of the same in a more advanced stage; Fig. 4, a similar view of the same in a still more advanced stage; Fig. 5, a similar view of the same at a stage of still further advancement, and Fig. 6 a similar view of the same at a stage where new steps in the practice of the method cease.

As the pile or fire increases in height, the depth of the trench likewise increases until, as I practice the method, it reaches about eight feet below the surface, when, for convenience, I avoid increasing the depth and continue the digging of the clay to the same, thus gradually augmenting the width of the trench or ditch. With the increase of the fire or pile to a height that renders it impracticable to throw the clay from the ditch toward and upon the top, stages, as shown in Fig. 1, are used. I form these stages by means of brackets, three or four in number for each stage, and comprising each two arms secured together to extend at right angles from each other and connected at their extremities by means of a diagonal brace. One arm of each bracket is planted against the side of the pile at the desired height to cause the other arm to extend horizontally, or practically so, and upon the three or four brackets thus planted adjacently a platform is imposed. While the matter of providing these stages does not essentially form a feature of my improved method, it is referred to in this connection for the sake of completeness in the description. It may, however, be said that I have devised machinery (for which I shall make in the near future application for Letters Patent of the United States) whereby an equal amount of the work may be performed in the same time as with the aid of a large number of hands, and whereby, also, the height of the fire need not be limited in the manner aforesaid. The stages referred to, which may be readily transplanted, serve as platforms upon which to throw the clay from the ditch and to support men, who can thus throw the clay and coal for slacking thrown to them to the desired heights upon the pile or fire. When the fire obtains a sufficient height beyond which its management by the means employed would be difficult or impracticable, the top is leveled, as shown in Fig. 6, and the piling is continued at that height upon the sloping side, as follows: Upon the upper edge of the slope a ridge, which I term a "shoulder," as shown in Fig. 6, is formed by coaling the top to a width of from two to three feet, then throwing clay on the coal from the stages. When the shoulder becomes sufficiently burned or aglow and the sloping side is ready for an additional application of clay, the red-hot shoulder is shoveled down upon the side of the pile, thereby causing it to fill up unevennesses and giving renewed impetus to the fire. The slope is then coaled and covered with clay, as hereinbefore described, when another shoulder is formed, to be heated in a manner similar to that already described.

It requires, generally speaking, a day for the fire to attain the condition desired for the shoulder to acquire the degree of heat to produce the required effect when shoveled off, so that it may be stated that the formation of a new shoulder is produced each day, other things being equal. A further object of the shoulder is to insure well-burned ballast on the top equal in quality to the rest of the pile.

By means of the long fire I am enabled to produce the material quicker and in greater quantities and at considerably smaller cost than with the cone-shaped heap described in my said former patent, and at the same time, by the method of working and spreading the pile which I have described, I obviate the production of inferior grades. The trench or ditch also performs incidentally an important function, as I find in the practice of my improvement. When the wind blows against the side of the pile being burned, it strikes the trench, producing currents which cause the fire to burn at and near the base of the pile with greater vigor than it otherwise would.

It is sometimes necessary to water the clay, particularly when it is of a crumbly nature. In Fig. 1 I show means for the purpose.

What I claim as new, and desire to secure by Letters Patent, is—

1. The method of burning clay to produce the material herein described, which consists in making a fire in the open air, forming a trench adjacent to the fire, covering the fire with clay from the trench, slacking the covering of clay, and drawing or raking the fire at required intervals of time to produce and maintain a fire sloping toward the trench, and undermining the fire at the trench to precipitate it into the same preparatory to further slacking and covering with clay, substantially as described.

2. The method of burning clay to produce the material herein described, which consists in making a long fire in the open air, covering the fire so formed with clay, slacking the covering of clay, and drawing or raking the fire at required intervals of time to produce and maintain a laterally-sloping long fire, then forming a shoulder lengthwise near the edge of the top of the pile with an additional layer of the slacking material and clay, and precipitating the material forming the burning shoulder down upon a sloping side of the pile preparatory to further slacking and covering with clay, substantially as described.

3. The method of burning clay to produce the material herein described, which consists in making a fire in the open air, forming a trench adjacent to the fire, covering the fire with clay from the trench, slacking the covering of clay, and drawing or raking the fire at required intervals of time to produce and maintain a fire sloping toward the trench, undermining the fire at the trench to precipitate it into the same, forming a shoulder lengthwise near the edge of the top of the pile with an additional layer of the slacking material and clay, and precipitating the material forming the burning shoulder down upon the sloping side of the pile into the trench preparatory to further slacking and covering with clay, substantially as described.

WILLIAM DAVY.

In presence of—
  CHAS. E. GAYLORD,
  J. W. DYRENFORTH.